United States Patent
Skaug

(10) Patent No.: US 8,587,708 B2
(45) Date of Patent: Nov. 19, 2013

(54) IMAGE SENSORS WITH LOW NOISE MODE FOR PIXEL ARRAY CURRENT BIAS

(75) Inventor: Steffen Skaug, Oslo (NO)

(73) Assignee: Aptina Imaging Corporation, George Town (KY)

( * ) Notice: Subject to any disclaimer, the term of this patent is extended or adjusted under 35 U.S.C. 154(b) by 265 days.

(21) Appl. No.: 13/035,583

(22) Filed: Feb. 25, 2011

(65) Prior Publication Data
US 2012/0194715 A1   Aug. 2, 2012

Related U.S. Application Data

(60) Provisional application No. 61/436,925, filed on Jan. 27, 2011.

(51) Int. Cl.
*H04N 3/14* (2006.01)
*H04N 5/235* (2006.01)

(52) U.S. Cl.
USPC .................................. 348/300; 348/229.1

(58) Field of Classification Search
USPC ............ 348/300, 301, 229.1, 308, 241; 257/291, 292; 250/208.1
See application file for complete search history.

(56) References Cited

U.S. PATENT DOCUMENTS

| | | |
|---|---|---|
| 5,087,610 A | 2/1992 | Hed |
| 6,667,767 B1 | 12/2003 | Muramatsu et al. |
| 6,690,000 B1 | 2/2004 | Muramatsu et al. |
| 6,727,486 B2 | 4/2004 | Choi |
| 2008/0143860 A1* | 6/2008 | Sato ............................. 348/301 |
| 2010/0309356 A1* | 12/2010 | Ihara et al. .................... 348/300 |

* cited by examiner

*Primary Examiner* — Nhan T Tran
(74) *Attorney, Agent, or Firm* — Treyz Law Group; G. Victor Treyz; David C. Kellogg

(57) ABSTRACT

An electronic device may have an image sensor for capturing digital image data of a scene. The image sensor may have an array of image sensor pixels. The image sensor pixels may have photosensitive elements for capturing image data signals. The image data signal from each photosensitive element may be conveyed to an output line associated with a column of the array using a source-follower transistor. The source-follower transistors may be provided with a current bias using current source coupled to each output line. The current source may include a configurable current source transistor that has multiple branches that can be selectively switched into use to adjust transconductance and drain saturation voltage characteristics for the current source. Gate structures in the configurable current source transistor may be supplied with a reference voltage from an adjustable voltage reference circuit.

5 Claims, 4 Drawing Sheets

IMAGE SENSORS WITH LOW NOISE MODE FOR PIXEL ARRAY CURRENT BIAS

This application claims the benefit of provisional patent application No. 61/436,925, filed Jan. 27, 2011, which is hereby incorporated by reference herein in its entirety.

BACKGROUND

The present invention relates to image sensors and, more particularly, to image sensors with current sources for biasing pixel array transistors.

Image sensors are commonly used in electronic devices such as cellular telephones, cameras, and computers to capture images. In a typical arrangement, an image sensor has an array of image sensor pixels. Each image sensor pixel has a photosensitive element for capturing light and converting the light into stored charge. Each image sensor pixel also has readout circuitry. The readout circuitry of each image sensor pixel typically includes a source-follower transistor that supplies a pixel output voltage to one of the output columns of the array. Proper biasing of the source-followers can be performed using current sources. The signals from the output columns can be amplified using amplifier circuitry.

The current sources that are used for biasing the source-follower transistors are typically each formed from a metal-oxide-semiconductor (MOS) transistor characterized by a transconductance parameter gm and a saturation voltage parameter vdsat. These parameters are related. A transistor with a large gm value will generally have a low value of vdsat and a transistor with a small gm value will generally have a large value of vdsat.

Care must be taken when designing the current source transistors. In bright image conditions, the output voltage swing from the image pixels will be large. If a current source transistor has a vdsat value that is too large, the current source will be saturated and will not be able to accommodate the large output voltage swing. In dark light conditions, on the other hand, large gm values (and therefore small vdsat values) can be associated with undesirable current source noise.

It would therefore be desirable to be able to provide current source circuitry and other image sensor circuitry that is able to operate effectively in a wide variety of lighting conditions.

DETAILED DESCRIPTION

Electronic devices such as digital cameras, computers, cellular telephones, and other electronic devices include image sensors that gather incoming light to capture an image. The image sensors include arrays of image pixels. The pixels in the image sensors include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
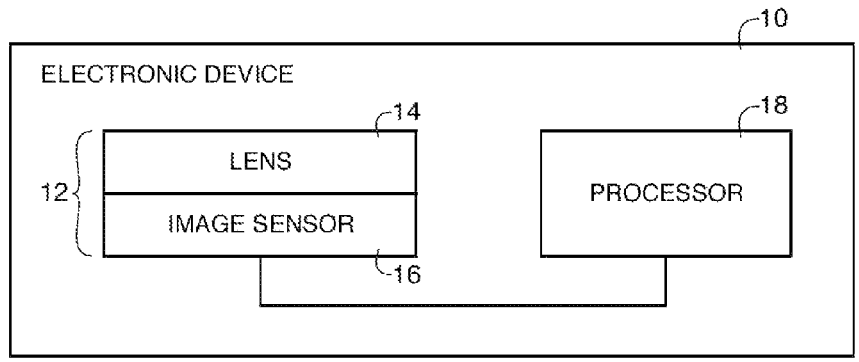
FIG. 1 is a diagram of an illustrative electronic device that contains an image sensor in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include lens 14 and a corresponding image sensor 16. During image capture operations, light from a scene may be focused onto image sensor 16 by lens 14. Image sensor 16 provides corresponding digital image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
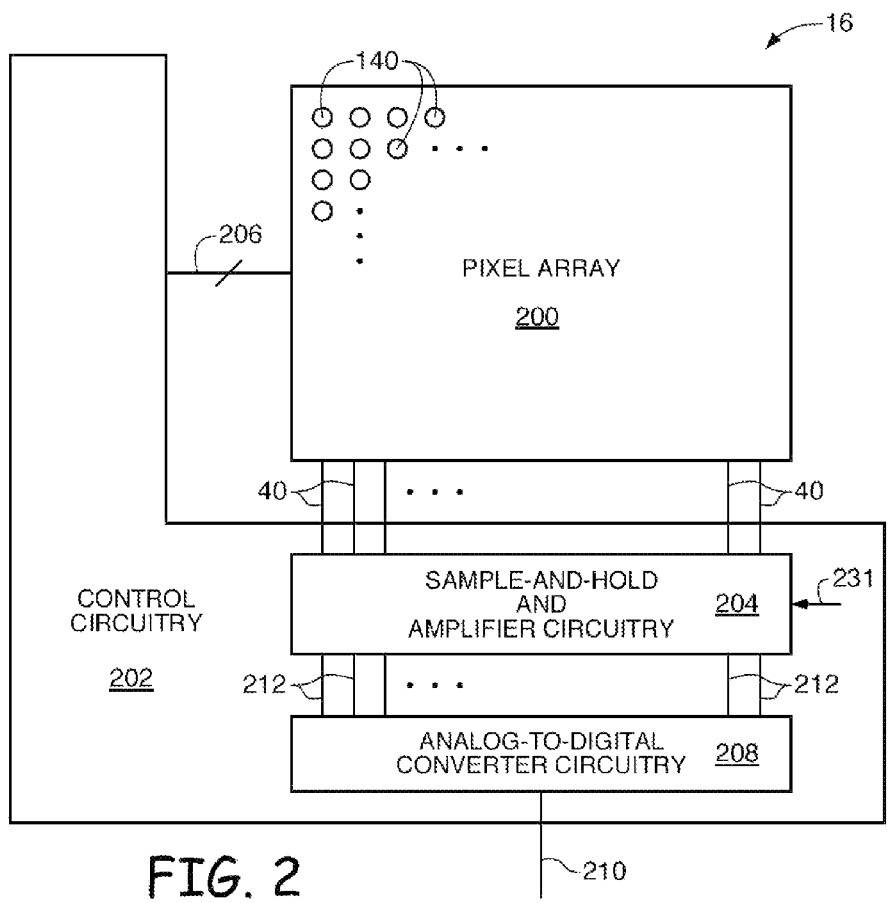
FIG. 2 is a diagram of an illustrative pixel array and associated control circuitry for generating control signals and reading out pixel data in an image sensor in accordance with an embodiment of the present invention.

As shown in FIG. 2, image sensor 16 may include a pixel array 200 containing image sensor pixels 140. Array 200 may contain, for example, hundreds or thousands of rows and columns of image sensor pixels 140. Control circuitry 202 may be used to supply control signals such as reset, transfer, and read control signals to pixel array 200 over control paths 206. Output lines 40 may be associated with each of the columns of pixels 140 in array 200. During pixel readout operations, a row in array 200 may be selected by control circuitry 202 and the image data associated with that row can be read out along respective column output lines 40.

Control circuitry 202 may include sample-and-hold and amplifier circuitry 204. The amplifier circuitry in sample-and-hold and amplifier circuitry 204 may be used to amplify signals on lines 40. The gain of this amplifier circuitry may, if desired, be adjustable. For example, the amplifier in circuitry 204 may be set to a operate in a first gain mode (sometimes referred to as a low gain mode) in which the amplifier has a gain of unity or near unity whenever image sensor 16 is being used to capture bright light images and may be set to operate in a second gain mode (sometimes referred to as a high gain mode) in which the amplifier has an elevated gain whenever image sensor 16 is being used to capture dark images (i.e., images in which ambient lighting conditions are dark). The gain of the amplifier in circuitry 204 may be controlled using gain mode control signals on input line 231.

Analog-to-digital converter circuitry 208 may receive the sampled analog pixel output voltages from sample-and-hold and amplifier circuitry 204 over paths 212 and may supply corresponding digital data to processor 18 (FIG. 1) over path 210.

Figure 3:
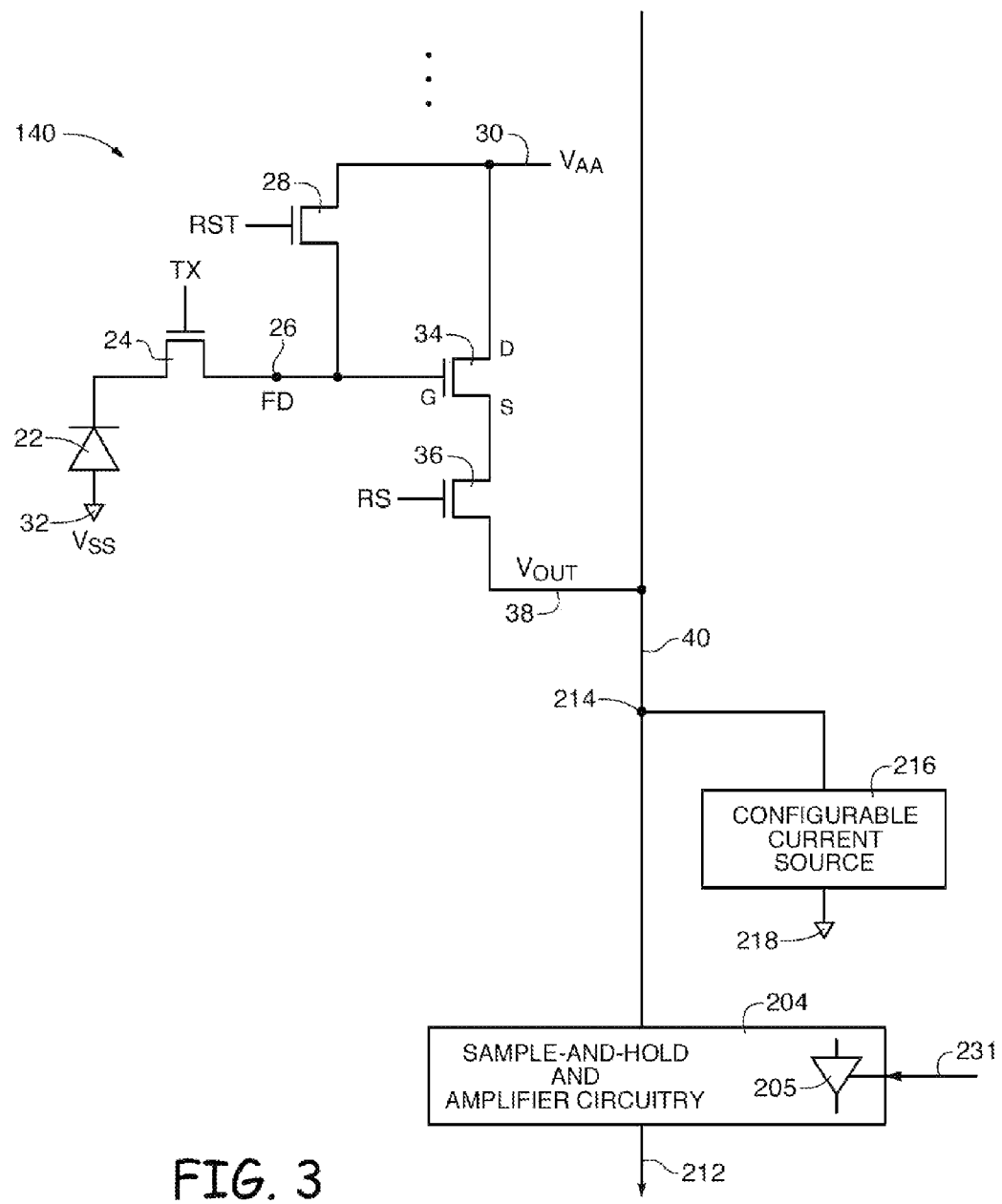
FIG. 3 is a circuit diagram of an illustrative image sensor pixel and associated current source and amplifier circuitry in accordance with an embodiment of the present invention.

Circuitry in an illustrative pixel of one of the image sensors in sensor array 16 is shown in FIG. 3. As shown in FIG. 3, pixel 140 includes a photosensitive element such as photodiode 22. A positive power supply voltage (e.g., voltage Vaa) may be supplied at positive power supply terminal 30. A ground power supply voltage (e.g., Vss) may be supplied at ground power supply terminal 32 and ground terminal 218. Incoming light is collected by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26. Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 140 in array 12. A vertical conductive path such as path 40 can be associated with each column of pixels. When signal RS is asserted in a given row, path 40 can be used to route signal Vout from that row to readout circuitry such as sample-and-hold and amplifier circuitry 204. Sample-and-hold and amplifier circuitry 204 may contain an adjustable-gain amplifier in series with a sample-and-hold circuit. The gain of the adjustable-gain amplifier may be controlled by gain mode control signals received on input 231. The gain of the amplifier may, for example, be set to a high value when it is desired to use image pixels 140 to gather image data from a dark scene (i.e., a scene with low ambient lighting) and may be set to a low value when it is desired to use image pixels 140 to gather image data from a bright scene (i.e., a scene with high ambient lighting).

Configurable current source 216 is coupled between column output line 40 at node 214 and ground 218. During operation, configurable current source 216 supplies a fixed current bias to source-follower transistor 34 via column readout line 40. Current source 216 may be implemented using metal-oxide-semiconductor transistor circuitry that is characterized by parameters such as transconductance gm and drain saturation voltage vdsat. For a given current source configuration, there is a tradeoff between gm and vdsat, such that increased values of gm result in lower values of vdsat and vice versa. By configuring current source 216 to accommodate different operating modes of device 10 (e.g., by adjusting current source 216 by changing the parameters gm and vdsat in response to different ambient lighting conditions), the operation of current source 216 and sensor 16 can be optimized.

The transistor circuitry of current source 216 may be biased using a reference voltage source. A reference voltage may, for example, be applied to gate structures in the metal-oxide-semiconductor transistor circuitry of current source 216. To suppress the influence of noise on the gate structures, it is generally desirable to minimize gm and accept the associated rise in vdsat. The value of vdsat, however, should be relatively low when it is desired to handle a relatively large voltage swings on output path 40 to ensure that the current source does not become saturated.

These competing goals can be satisfied and sensor performance can be enhanced by configuring current source 216 in response to detected changes in lighting conditions. The current supplied by current source 216 remains fixed, but the configuration of the components of current source 216 allows different values of gm and vdsat to be chosen depending on the operating mode of device 10.

When, for example, it is determined that sensor 16 is to be used to capture an image in dark lighting conditions, the swing in output voltage Vout from the pixels in array 200 is expected to be small. The amplifier in circuitry 204 (shown as amplifier 205 in FIG. 3) may therefore be set to a high gain mode. Because the voltage swing in signal Vout is expected to be small, configurable current source 216 may be placed in a low gm, high vdsat mode. The relatively high value of vdsat can be accommodated when operating in dark lighting conditions, because even when vdsat is high, the low voltage swing in Vout will not saturate current source 216. When vdsat is high, gm is low, which reduces noise from the current source device itself, as well as from voltage fluctuations on the current source gate structures.

When, on the other hand, it is determined that sensor 16 is to be used to capture an image in bright lighting conditions, the swing in output voltage Vout on the column lines is expected to be large. Amplifier 205 may therefore be set to a low gain mode (e.g., amplifier 205 may be set to a gain mode in which amplifier 205 exhibits unit gain or nearly unit gain). Because the expended swing in Vout is large, configurable current source 216 may be placed in a high gm, low vdsat mode. The low value of vdsat that is exhibited by current source 216 in this mode helps ensure that current source 216 is not saturated and that voltage swing is maximized. The high value of gm that accompanies the low vdsat value tends to increase current source noise somewhat, but in bright lighting conditions, noise from the current source is dominated by noise from other sources (e.g., shot noise, etc.), and is therefore acceptable.

Figure 4:
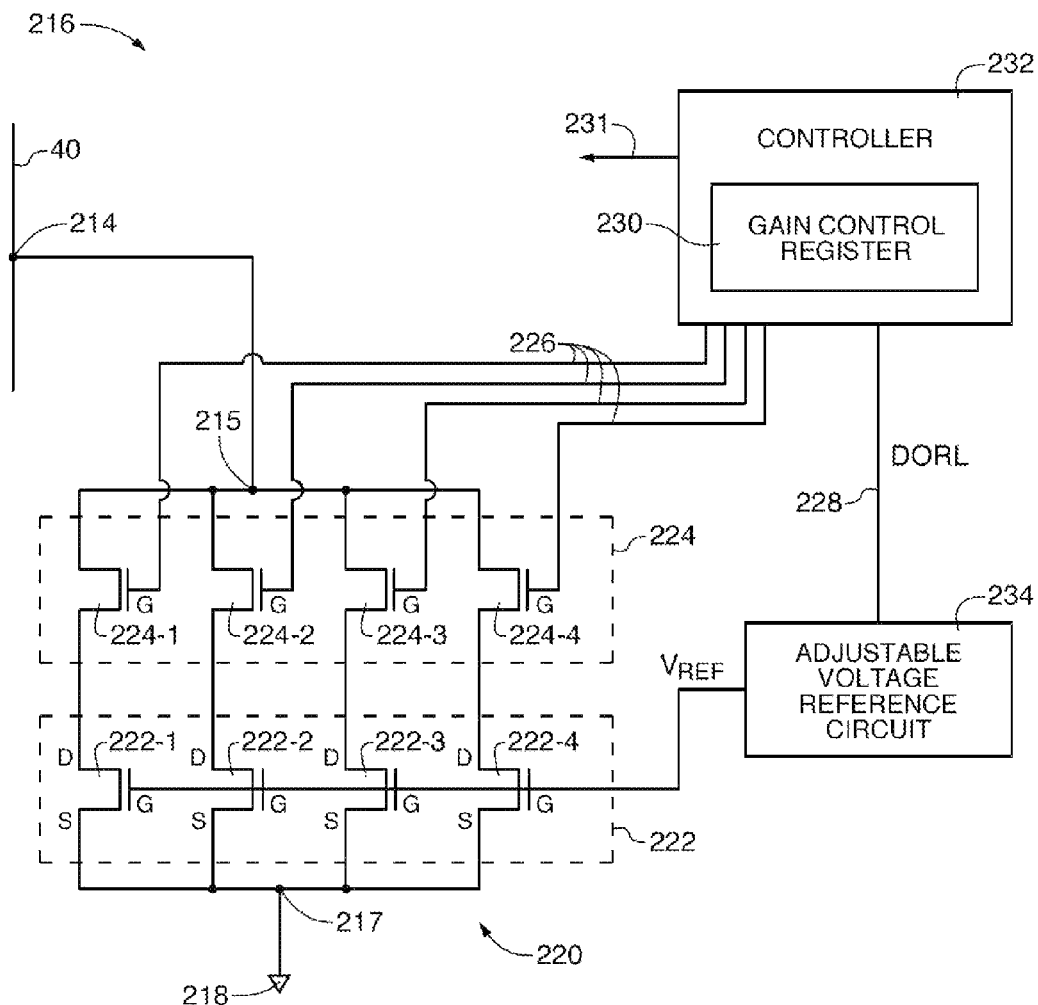
FIG. 4 is a circuit diagram of an illustrative configurable current source and associated control circuitry for adjusting the configurable current source in accordance with an embodiment of the present invention.

FIG. 4 is a circuit diagram of circuitry associated with configurable current source 216. As shown in FIG. 4, configurable current source 216 may have a configurable transistor such as transistor 220. Transistor 220 may have a first terminal such as terminal 215 that is coupled to node 214 on pixel array output line 40 and may have a second terminal such as terminal 217 that is coupled to ground terminal 218. Controller 232 (i.e., control circuitry that is part of control circuitry 202 of FIG. 2) may maintain information on the current operating mode (e.g., the current gain mode) for image sensor 16 in gain control register 230 or other storage. The contents of gain control register 230 may be established based on information on the current ambient lighting conditions for capturing an image with sensor 16. For example, processor 18 may use a light meter sensor to determine whether the scene that a user is capturing is dark or light (e.g., using an autoexposure routine). If bright lighting conditions are detected, gain control register 230 may be loaded with data that sets image sensor 16 to a low gain mode. If dark lighting conditions are detected, gain control register may be loaded with data that sets image sensor 16 to a high gain mode.

Transistor 220 may have multiple branches. The branches of transistor 220 may include multiple respective subtransistors 222 that can be selectively switching into use or out of use using switching transistors 224. With the illustrative arrangement shown in FIG. 4, each branch of configurable transistor 220 has a respective one of subtransistors 222 and a respective one of switching transistors 224 connected in series between node 217 and node 215. In a first branch of configurable transistor 220, current source subtransistor (transistor) 222-1 is connected in series with switching transistor 224-1. In a second branch of configurable transistor 220, current source subtransistor 222-2 is connected in series with switching transistor 224-2. In a third branch of configurable transistor 220, current source subtransistor 222-3 is connected in series with switching transistor 224-3. Current source subtransistor 222-4 is connected in series with switching transistor 224-4 in a fourth branch of configurable transistor 220.

The drains and sources of transistors 222 and 224 and the other metal-oxide-semiconductor transistors of image sensor 16 are sometimes collectively referred to herein as source-drain terminals. As shown in FIG. 4, a first source-drain terminal of each of transistors 222 (e.g., the drain terminal) may be coupled to ground 218 and a second source-drain terminal of each transistor 222 (e.g., the source terminal) may be coupled to a first source-drain terminal of a respective one of switching transistors 224. A second source-drain terminal of each switching transistor 224 may be coupled to node 215.

By asserting or deasserting a control signal on a respective one of lines 226, controller 232 can turn on or off a corresponding one of transistors 224 and thereby change the gm and vdsat values of configurable transistor 220. If, for example, controller 232 asserts the control signals on all of lines 226, all of transistors 224 will be turned on and all of subtransistors 222 will be switched into use. When all of subtransistors 222 are switched into use, configurable transistor 220 will be characterized by a high gm value and a low vdsat value. If, as another example, controller 232 asserts the control signal on one of lines 226 while deasserting the control signals on the remaining three lines 226, one of transistors 222 will be switched into use and the other transistors 222 will be switched out of use (i.e., deactivated). In this configuration, configurable transistor 220 will be characterized by a low gm value and a high vdsat value. Other configurations may be used for transistor 220 if desired (e.g., one or more intermediate configurations in which gm and vdsat have intermediate values). If desired, configurable transistor 220 may have more branches or fewer branches than the configuration shown in FIG. 4. The configuration shown in FIG. 4 is merely illustrative.

Adjustable voltage reference circuit 234, which may, as an example, be based on a current mirror circuit, supplies reference voltage Vref to the gates G of transistors 222. During operation in a given gain mode, the magnitude of the reference voltage Vref is fixed. This biases current source transistors 222 so configurable transistor 220 serves as a current source. To ensure that the current source produces the same amount of current regardless of its gm and vdsat settings, adjustable voltage reference circuit 234 may adjust the value of Vref depending on which mode image sensor 16 is operating in. In particular, controller 232 may issue control commands DORL on path 228 that direct adjustable voltage reference circuit 234 to produce desired values of Vref to supply to the gate structures associated with transistors 222. In low gain mode, all four of transistors 224 may be switched into use (as an example) and the value of Vref may be set to a lower reference voltage value Vreflow. In high gain mode, only one of transistors 224 may be switched into use (as an example). To compensate for the lower number of active transistor branches when operating in high gain mode (i.e., to ensure that the current produced by current source 216 is unchanged relative to the low gain mode), Vref may be set to a higher voltage reference value of Vrefhigh.

Figure 5:
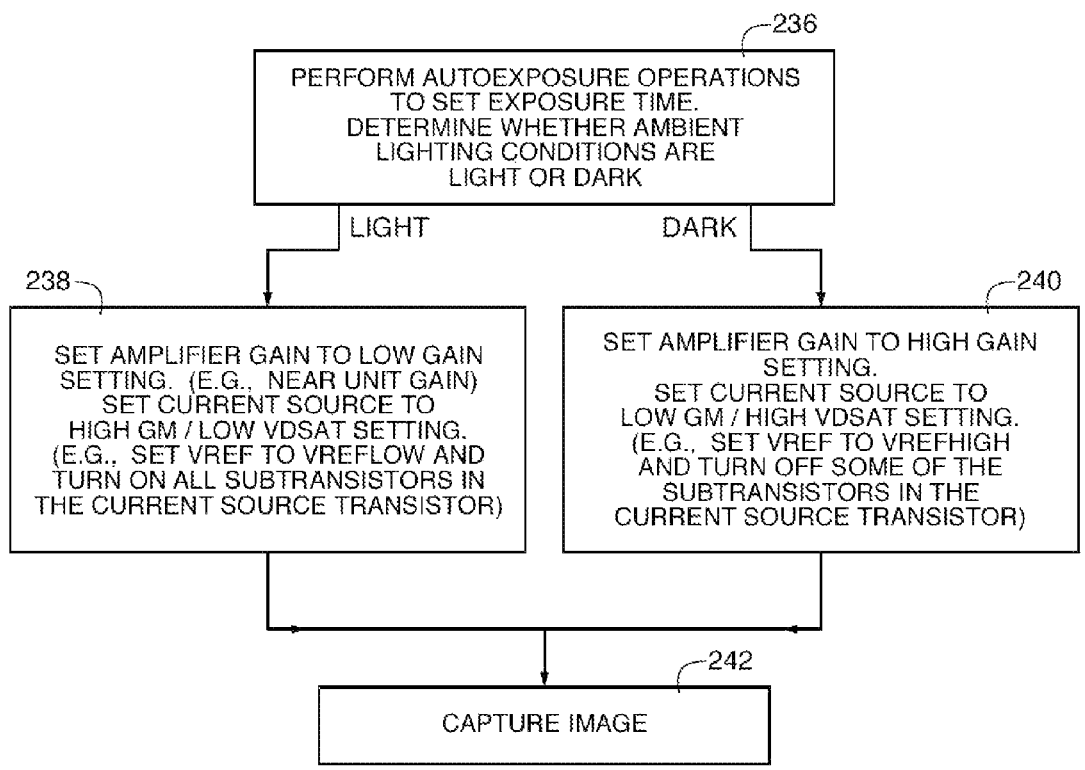
FIG. 5 is a flow chart of illustrative steps involved in capturing images using an image sensor with configurable current source circuitry in accordance with an embodiment of the present invention.

Illustrative steps involved in using image sensor 16 to capture images in device 10 are shown in FIG. 5. The images that are captured may be still images or may be video images (e.g., sequences of video frames). A user of device 10 may instruct device 10 to capture images using any suitable user interface (e.g., a dedicated button, a button on a menu screen, etc.).

At step 236, in response to user input to capture an image or other suitable input, device 10 may use a light meter or other sensor circuitry to determine the amount of light available for capturing an image. In particular, processing circuitry 18 may make a light measurement of the scene to be imaged to determine whether ambient lighting conditions are bright or dark. Using an autoexposure algorithm or other control code running on processor 18, device 10 can determine whether the exposure time for the image should be long or short and may determine whether the gain mode for amplifier 205 should be high or low.

If it is determined that the scene for which the image is being captured is bright, device 10 may perform the operations of step 238. In particular, device 10 may store corresponding low gain mode settings in gain control register 230. Controller 232 may then use path 231 to set the gain setting of amplifier 205 to a low gain mode. Controller 232 can issue control commands to switchable transistors 224 that switch all of transistors 222 into use to provide transistor 220 with high gm and low vdsat characteristics. Controller 232 can also issue control commands to adjustable voltage reference circuit 234 to provide the Vref value of Vreflow to the gates of subtransistors 222.

If it is determined that the scene for which the image is being captured is dark, device 10 may perform the operations of step 240. In particular, device 10 may store corresponding high gain mode settings in gain control register 230. Based on these settings, controller 232 may then use path 231 to set the gain setting of amplifier 205 to a high gain mode. Controller 232 can issue control commands to switchable transistors 224 that switch a subset of transistors 222 into use (e.g., one of the transistors 222) to provide transistor 220 with low gm and high vdsat characteristics. Controller 232 can also issue control commands to adjustable voltage reference circuit 234 to provide the Vref value of Vrefhigh to the gates of the active subtransistor(s) 222 to compensate for the loss of active branches in transistor 220 and thereby ensure that the magnitude of the current that is supplied by configurable current source 216 remains at its desired fixed level.

After configuration of the gm and vdsat values of current source 216 and otherwise configuring image sensor 16 at steps 238 and 240 to have appropriate settings in response to detection of whether the scene to be imaged is light or dark, an image may be captured using image sensor 16 (step 242).

Various embodiments have been described illustrating an electronic device having an image sensor for capturing digital image data of a scene. The image sensor may have an array of image sensor pixels. The image sensor pixels may have photosensitive elements for capturing image data signals. The image data signal from each photosensitive element may be conveyed to an output line associated with a column of the array using a source-follower transistor. The source-follower transistors may be provided with a current bias using a current source circuitry. A current source may be coupled to each output line. The current source may include a configurable current source transistor that has multiple branches that can be selectively switched into use to adjust transconductance and drain saturation voltage characteristics for the current source transistor. Each branch of a configurable current source transistor may contain a subtransistor with a gate. The gates of the subtransistors may be supplied with a reference voltage from a voltage reference circuit. The voltage reference circuit may be configured to supply different reference voltages in different modes of operation. Amplifier circuitry in the image sensor and the configurable current source transistor may also be placed in different configurations in each of the different modes of operation.

The foregoing is merely illustrative of the principles of this invention which can be practiced in other embodiments.

What is claimed is:

1. An image sensor for capturing images of a scene, comprising:
   an array of image sensor pixels each having a photosensitive element and a source-follower transistor;
   a plurality of output voltage lines that each receive output voltages from a column of the source-follower transistors in the array; and
   a plurality of configurable current source transistors, each configurable current source transistor being coupled to a respective one of the output voltage lines, wherein each configurable current source transistor is operable in a first mode in which the configurable current source transistor has a first transconductance and produces a first amount of current and a second mode in which the configurable current source transistor has a second transconductance and produces a second amount of current, wherein the first transconductance is less than the second transconductance, and wherein the first amount of current is substantially the same as the second amount of current.

2. The image sensor defined in claim 1 further comprising amplifier circuitry coupled to each output voltage line, wherein the amplifier circuitry is operable in a high gain mode and a low gain mode.

3. The image sensor defined in claim 2 further comprising a controller, wherein the controller is configured to place the amplifier circuitry in the high gain mode in a first set of lighting conditions for the scene and is configured to place the amplifier circuitry in the low gain mode in a second set of lighting conditions for the scene that is brighter than the first set of lighting conditions.

4. The image sensor defined in claim 3 further comprising:
   an adjustable voltage reference circuit that provides an adjustable reference to gate structures in each configurable current source transistor.

5. The image sensor defined in claim 1 wherein, in the first mode, each configurable current source transistor has a first drain saturation voltage, wherein, in the second mode, each configurable current source transistor has a second drain saturation voltage, and wherein the first drain saturation voltage is greater than the second train saturation voltage.

* * * * *